United States Patent
Yoshinaga

(10) Patent No.: US 7,385,652 B2
(45) Date of Patent: Jun. 10, 2008

(54) DISPLAY DEVICE AND DEFECT-RESTORATION METHOD THEREFOR

(75) Inventor: Tetsuji Yoshinaga, Kikuchi-gun (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 405 days.

(21) Appl. No.: 11/286,388

(22) Filed: Nov. 25, 2005

(65) Prior Publication Data

US 2006/0158596 A1    Jul. 20, 2006

(30) Foreign Application Priority Data

Jan. 18, 2005    (JP)    ............. 2005-010163

(51) Int. Cl.
G02F 1/1333    (2006.01)
G02F 1/1343    (2006.01)
G02F 1/136    (2006.01)
(52) U.S. Cl. ................. 349/54; 349/140; 349/44
(58) Field of Classification Search ........... 349/54, 349/140, 44, 139, 43
See application file for complete search history.

(56) References Cited

U.S. PATENT DOCUMENTS 5,081,513 A * 1/1992 Jackson et al. ............ 257/57
5,164,851 A * 11/1992 Kanemori et al. .......... 349/55
5,636,042 A * 6/1997 Nakamura et al. ......... 349/123
5,883,437 A * 3/1999 Maruyama et al. ........ 257/773
5,977,563 A * 11/1999 Kubo et al. ................ 257/72

FOREIGN PATENT DOCUMENTS

JP    9-179143    7/1997

* cited by examiner

*Primary Examiner*—Mike Qi
(74) *Attorney, Agent, or Firm*—Oblon, Spivak, McClelland, Maier & Neustadt, P.C.

(57) ABSTRACT

Provision is made for a defect to be restored, by securely turning a luminescent-point defect of a display device to a dark point. In a display device including a scanning line (1), a video signal line (4) intersecting with the scanning line, a semiconductor film (3) and a restoration conductor (10) composed a semiconductor film that are formed, with an insulating film intervening, on a gate electrode (2) and on a portion, of the scanning line, that is apart from the gate electrode, respectively, a source electrode (5) that is formed on the semiconductor film and connected to the video signal line, a drain electrode (6) formed, opposing the source electrode, on the semiconductor film, a pixel electrode (9) connected to the drain electrode, and an extended portion (7) that is connected to the drain electrode and formed so as to cover an edge portion, of the pixel electrode, that is in the vicinity of the scanning line, the restoration strip conductor is connected to the extended portion.

6 Claims, 4 Drawing Sheets

DISPLAY DEVICE AND DEFECT-RESTORATION METHOD THEREFOR

BACKGROUND OF THE INVENTION

1. Field of the Invention

The present invention relates to display devices in which pixel defects can be restored, and is suitably applicable to liquid crystal display devices, in particular.

2. Description of the Related Art

An active-matrix-driving liquid crystal display device is configured in such a way that switching devices such as TFTs (Thin Film Transistor) are connected to pixel electrodes arranged in a matrix on one of a pair of insulating substrates to be bonded with each other, and selection or non-selection of each pixel electrode is implemented through switching operation by the switching device, thereby carrying out display operation. In general, a TFT has a multi-layer structure in which a semiconductor layer, an insulating layer, and various kinds of electrodes for driving a liquid crystal are stacked up; therefore, in order to produce a TFT, deposition of each layer on an insulating substrate and patterning is repeatedly carried out. As a result, in the case where a switching device is produced, a defect may occur in which normal switching operation is not implemented due to breaking of wires or short-circuiting. In this case, a pixel consisting of a pixel electrode connected to a defective switching device becomes a defective pixel to which no voltage is applied. There has been a problem in that, especially in a liquid crystal display device in a normally-white-mode in which, when the power supply is OFF, a display screen is set to be white, the defective pixel makes a luminescent-point defect through which light is always transmitted.

In this regard, in order to make luminescent-point defects in a liquid crystal display device inconspicuous, a method has been disclosed (e.g., refer to Japanese Laid-Open Patent Publication No. 1997-179143) in which, by irradiating a laser beam onto a portion, corresponding to a pixel having a luminescent-point defect, where the drain electrode and the gate wiring overlap each other and creating a short-circuit between the drain electrode and the gate wiring that have been separated by an insulating film, and by making the voltage supplied to the gate wiring always be supplied to the drain electrode and making the pixel be always in a power-on state, the luminescent-point defect is turned to a dark-point defect, thereby being made inconspicuous.

SUMMARY OF THE INVENTION

In this regard, however, in the conventional liquid crystal display device described above, the foregoing method is effective as long as the display device utilizes a liquid crystal having gradation properties, as represented in FIG. 6, in which the larger the voltage to be applied to the liquid crystal is, the lower the gradation is. However, in the case of a display device utilizing a liquid crystal having gradation properties in which, as represented in FIG. 7, when the voltage to be applied to the liquid crystal is the same as or higher than a predetermined value (indicated by X in FIG. 7, e.g., approximately 4 V), the gradation is high, there has been a problem in that, if the gate line voltage is directly applied to a pixel, the voltage to be applied to the liquid crystal exceeds the predetermined value, whereby the luminescent-point defect is not turned to a dark-point defect, but turned to a luminescent-point defect having a halftone gradation.

The present invention has been implemented in consideration of these problems; it is an object to provide a display device and a defect-restoration method therefor that enable a luminescent-point defect to be restored, even in the display device utilizing a liquid crystal having gradation properties in which, when the voltage to be applied to the liquid crystal is the same as or higher than a predetermined value, the gradation is high.

The present invention provides a display device including a scanning line formed including a gate electrode, on an insulating substrate, a video signal line formed intersecting, with an insulating film intervening, with the scanning line, a semiconductor film and a restoration conductor composed of a semiconductor film that are formed, with an insulating film intervening, on the gate electrode and on a portion, of the scanning line, that is apart from the gate electrode, respectively, a source electrode that is formed on the semiconductor film and connected to the video signal line, a drain electrode formed, opposing the source electrode, on the semiconductor film, a pixel electrode connected to the drain electrode, and an extended portion that is connected to the drain electrode and formed so as to cover an edge portion, of the pixel electrode, that is in the vicinity of the scanning line; the display device is characterized in that the semiconductor film (restoration strip conductor) is connected to the extending portion, the semiconductor film being formed, with an insulating film intervening, on a portion, of the scanning line, that is apart from the gate electrode.

According to the present invention, it is possible to restore a luminescent-point defect, even though a display device utilizes a liquid crystal having gradation properties in which, when the voltage to be applied to the liquid crystal is the same as or higher than a predetermined value, the gradation is high.

DETAILED DESCRIPTION OF THE PREFERRED EMBODIMENTS

Embodiment 1

Figure 1:
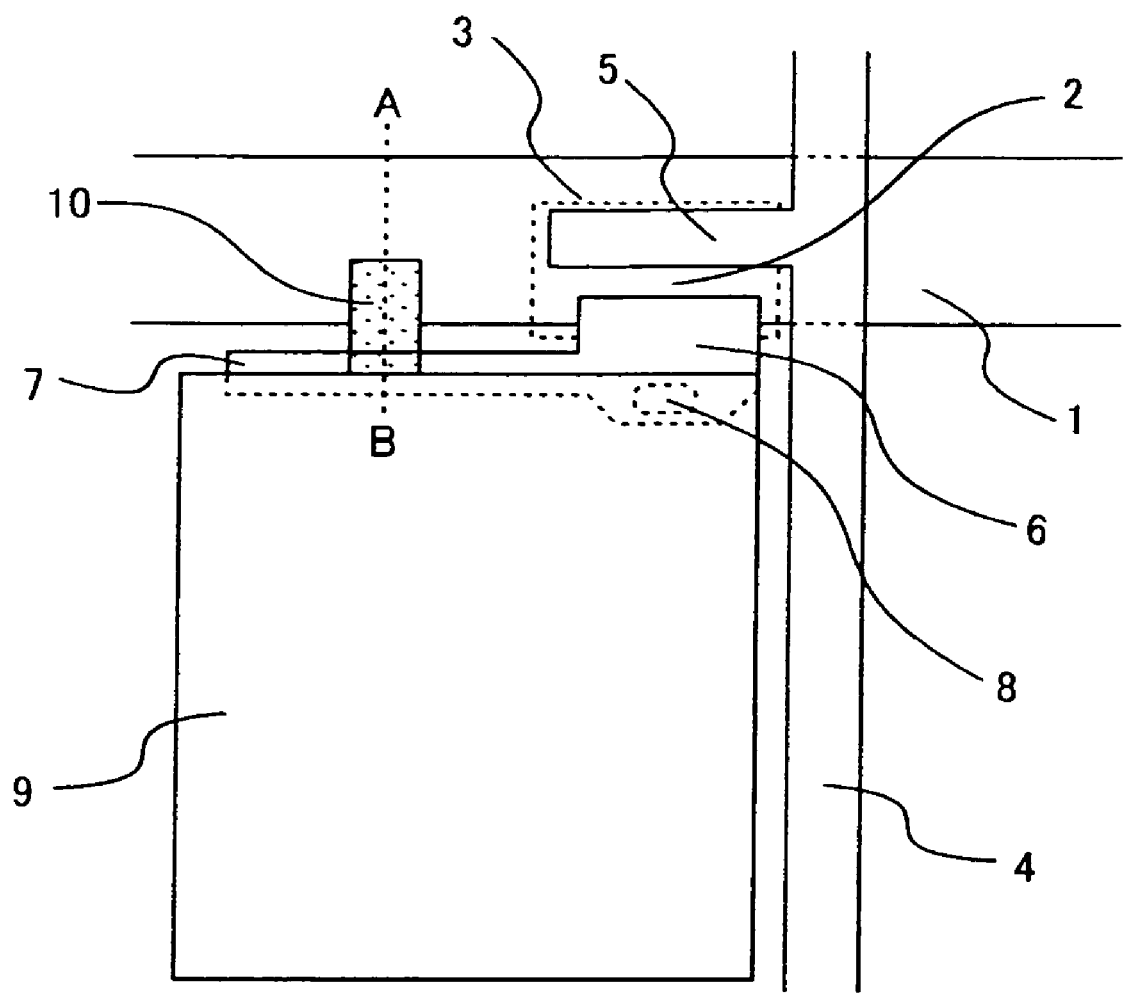
FIG. 1 is a plan view illustrating approximately one pixel of an active-matrix liquid crystal display device according to Embodiment 1 of the present invention.
Figure 2:
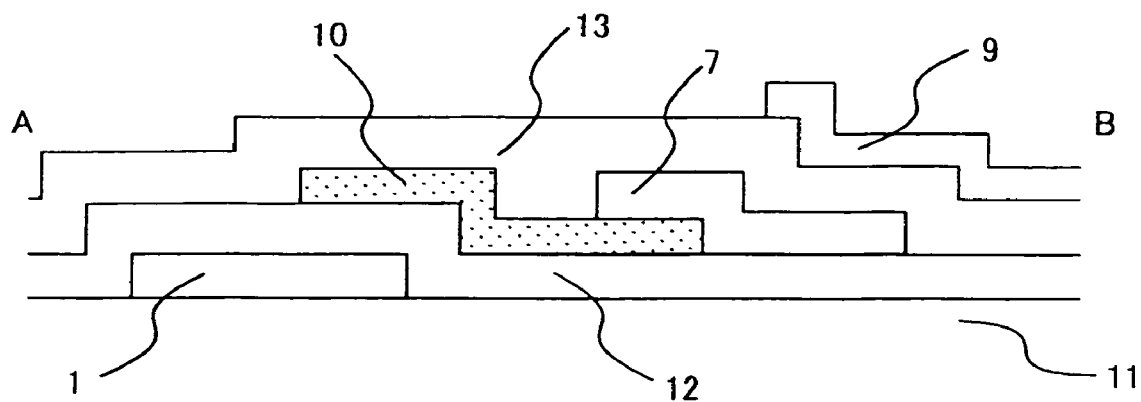
FIG. 2 is a cross-sectional view taken along the plane A-B in FIG. 1.
Figure 3:
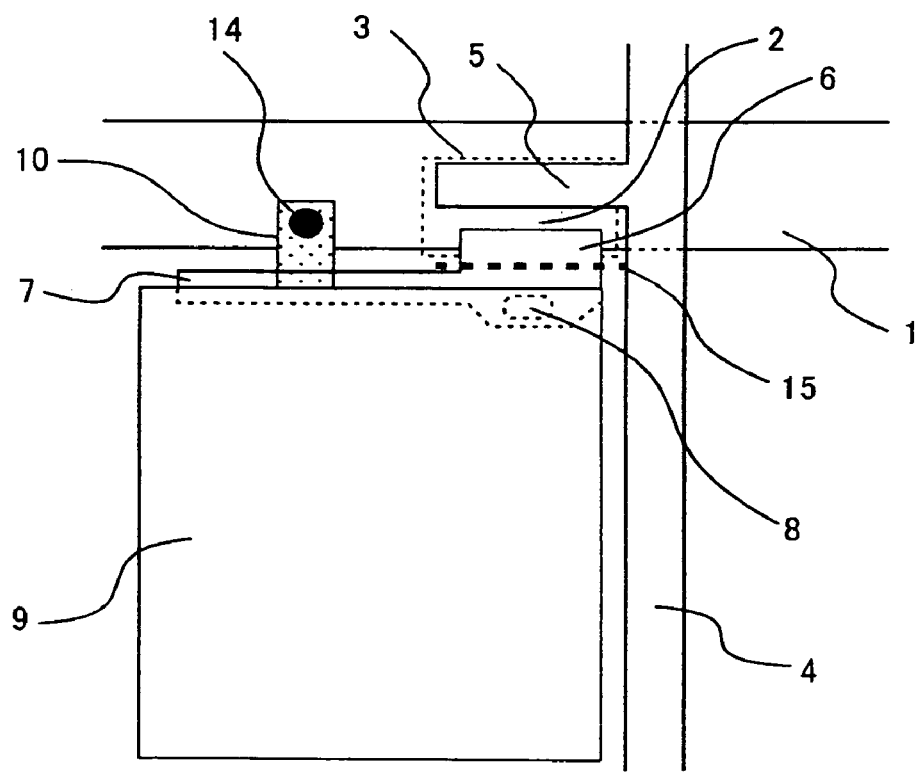
FIG. 3 is a plan view illustrating approximately one pixel for explaining a defective-pixel restoration method according to Embodiment 1 of the present invention.

Embodiment 1 of the present invention will be explained, referring to FIGS. 1 to 3. FIG. 1 is a plan view illustrating approximately one pixel of an active-matrix liquid crystal display device according to Embodiment 1 of the present invention; FIG. 2 is a cross-sectional view taken along the plane A-B in FIG. 1; and FIG. 3 is a plan view of approximately one pixel, for explaining a defective-pixel restoration method.

As illustrated in FIGS. 1 and 2, after being formed on an insulating substrate 11, a film is patterned by a scanning line (gate line) 1 including a gate electrode 2 of a TFT. As a conductive film for the scanning line, a thin film, formed of, for example, Al, Cr, Cu, Ta, Mo, or an alloy of Al, Cr, Cu, Ta, or Mo and another material is utilized. Thereafter, a gate insulating film 12, a semiconductor film 3, and an ohmic contact film (unillustrated) are consecutively formed through a film-formation apparatus such as a plasma CVD. As the gate insulating film 12, SiNx, SiOx, SiOxNy, or multilayer film formed of SiNx, SiOx, and SiOxNy, is utilized. As the semiconductor film 3, amorphous silicon (a-Si), polysilicon (p-Si), or the like is utilized. As the ohmic contact film, n-a-Si, or n-p-Si, obtained by doping an a-Si film or a p-Si film with a very small quantity of phosphor (P) or the like. Then, after applying a photolithography process to the semiconductor film and the ohmic contact film, the semiconductor film and the ohmic contact film are patterned through dry etching. In addition, while the semiconductor film and the ohmic contact film are patterned, in addition to a semiconductor film 3, a restoration strip conductor 10 composed of semiconductor film is formed that includes the scanning line excluding the gate electrode 2 and that is connected to an extended portion of a drain electrode described later.

Next, after being formed, a film is patterned by a video signal line 4. As a conductive film for the video signal line, a thin film, formed of, for example, Al, Cr, Cu, Ta, Mo, or an alloy of Al, Cr, Cu, Ta, or Mo and another material, a multilayer formed of different kinds of metal films, or a material whose composition varies along the direction of the film thickness, can be utilized. During patterning by the video signal line, a source electrode 5 and a drain electrode 6 are concurrently formed. As illustrated in FIG. 1, in Embodiment 1, in order to prevent light leakage due to liquid-crystal orientation disturbance, in the vicinity of the edge portion, of a pixel electrode, that is close to the scanning line, the extended portion 7 is formed of the same conductive film as that for the drain electrode, in such a way as to cover the edge portion, of a pixel electrode, that is close to the scanning line After patterning by the video signal line, with the video signal line, the source electrode, and the drain electrode being utilized as a mask, the ohmic contact film on the semiconductor film is removed through etching to create a channel portion of the TFT. In this situation, in a portion, of the restoration strip conductor 10, where the extended portion 7 of the drain electrode and the restoration strip conductor 10 overlap each other, the ohmic contact film remains; therefore, the restoration strip conductor 10 and the extended portion 7 are connected to each other.

Thereafter, after being formed through a film-formation apparatus such as a plasma CVD, an interlayer insulating film 13 is patterned. As the interlayer insulating film 13, as is the case with the gate insulating film 12, SiNx, SiOx, SiOxNy, or a multilayer film made up of SiNx, SiOx, and SiOxNy, is utilized. Through the patterning of the interlayer insulating film 13, a contact hole 8 is formed; accordingly, the drain electrode 6 and a pixel electrode 9 described later are electrically connected to each other, by way of the contact hole 8.

Thereafter, by forming on the interlayer insulating film 13 a conductive thin film, i.e., transparent metal such as ITO or $SnO_2$, that is supposed to become the pixel electrode 9, and by patterning through photolithography the conductive thin film in such a way as to be surrounded by the scanning line 1 and the video signal line 4, an insulating substrate on which a TFT is formed is completed.

In a fabrication process as described above, due to occurrence of foreign materials in forming, or in patterning, of each of conductive films and insulating films, a predetermined voltage may not be supplied from the video signal line 4 to the pixel electrode 9, whereby, in the case of a display device utilizing a normally-white-mode liquid crystal, a luminescent-point defect that occurs when no voltage is supplied to a pixel electrode may be caused. The defect is found through an inspection by means of an image-inspection apparatus or the like, during the fabrication process. In general, the occurrence of the luminescent-point defect significantly deteriorates display performance, thereby lowering a fabrication yield rate.

Thus, as illustrated in FIG. 3, in order to restore the foregoing defect, by irradiating a laser beam (indicated by reference numeral 14 in FIG. 3) onto the place where the restoration strip conductor 10 formed of a semiconductor film and the scanning line 1 overlap each other, a short-circuit between the restoration strip conductor 10 and the scanning line 1 is created by the resultant melted metal. It is preferable that the laser beam is generated through a YAG laser or an excimer laser, and it is further preferable that the wavelength of the laser beam is from 0.1 µm to 1.06 µm. Moreover, the irradiation direction of the laser beam may be from the front-surface side of an array substrate (from the video signal line) or from the rear-surface side of the array substrate (from the storage capacitance line). Still moreover, with regard to the irradiation intensity of the laser beam, it is preferable, in the case of irradiation onto a metal film, as described above, that the output density is from $1 \times 10^2$ to $1 \times 10^4$ $J/m^2$. Furthermore, it is preferable that the laser-beam irradiation coverage in a laser irradiation area 14 is approximately 2 µm in diameter; from the viewpoint of stability of connecting resistance, it is preferable to irradiate onto several positions (2 to 3 positions) within the place where the restoration strip conductor 10 and the scanning line 1 overlap each other. Accordingly, if the area of the place, where the restoration strip conductor 10 and the scanning line 1 overlap each other, is at least approximately not less than 2 µm×4 µm (scanning-line transverse direction×longitudinal direction), the restoration strip conductor 10 and the scanning line 1 can be connected to each other; however, if the area (overlapping place) of the place, where the restoration strip conductor 10 and the scanning line 1 overlap each other, is at least approximately not less than 4 µm×8 µm (scanning-line transverse direction×longitudinal direction), the foregoing laser beam having a diameter of approximately 2 µm can securely be irradiated, as described above, onto approximately 2 to 3 positions, even when an positioning error (max. approximately 1 µm) between the restoration strip conductor and the scanning line occurs; therefore, it is preferable because more stable connection and securer restoration of the defect are possible.

Figure 7:
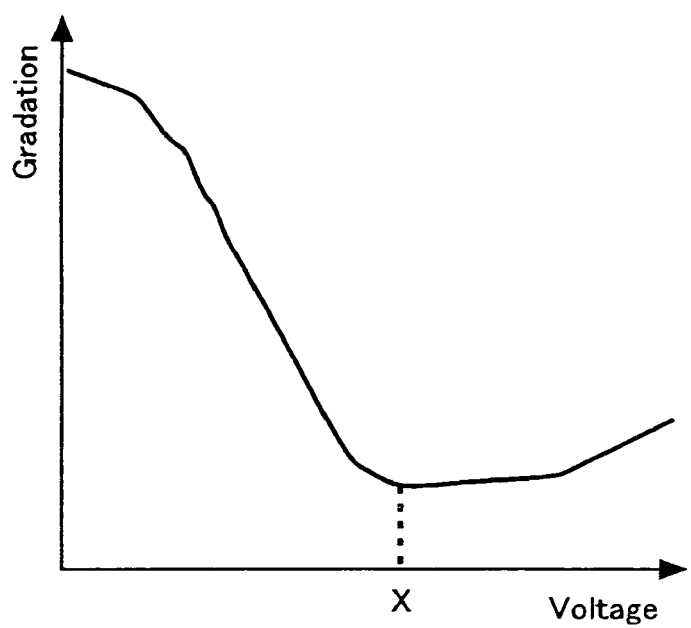
FIG. 7 is a diagram representing gradation properties of another liquid crystal.

With such a structure as described above, even in a display device utilizing a liquid crystal having gradation properties, as illustrated in FIG. 7, in which, when the voltage to be applied to the liquid crystal is the same as or higher than a predetermined value, the gradation is high, the voltage that is applied, by means of the restoration strip conductor formed of a semiconductor film, from the scanning line to the pixel electrode, is supplied by way of the high-resistance restoration strip conductor; therefore, due to a voltage drop, a voltage lower than a normal scanning-line voltage is applied to the pixel electrode, whereby occurrence of a halftone-gradation luminescent point due to a voltage higher than a predetermined voltage being applied can be suppressed, the luminescent-point defect can be turned to a dark point, and restoration of the defect can be implemented. In addition, if the cause of the defect is a short-circuit between the source electrode and the drain electrode, of the TFT, by cutting off a drain-electrode cutoff portion 15 illustrated in FIG. 3, through laser irradiation similar to that described above, the defect can be restored.

Embodiment 2

Figure 4:
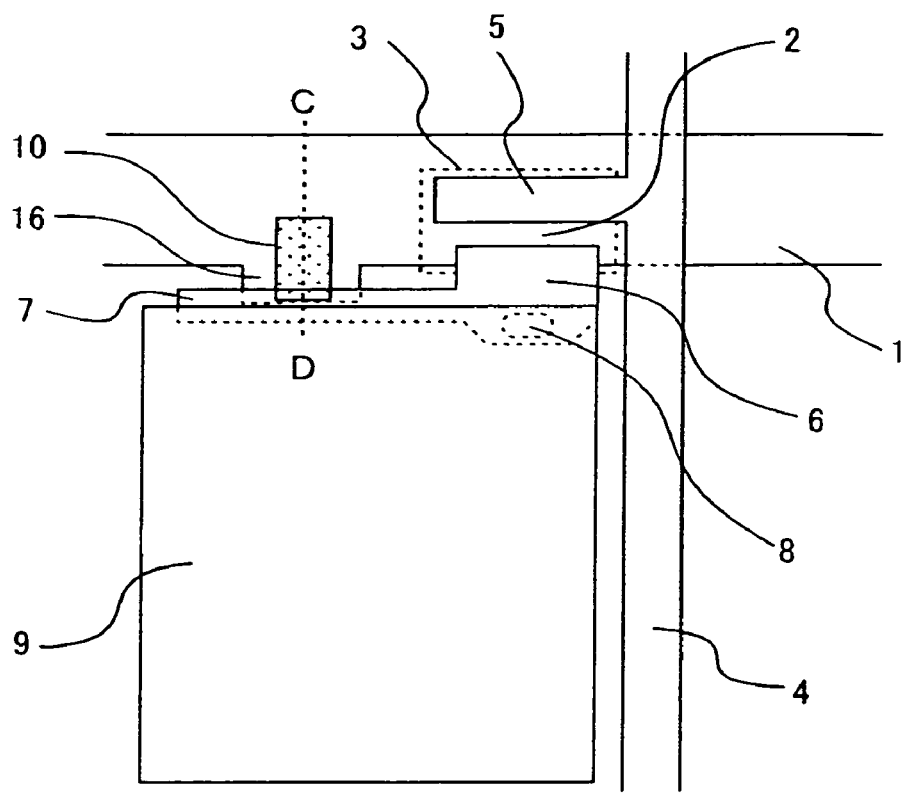
FIG. 4 is a plan view illustrating approximately one pixel of an active-matrix liquid crystal display device according to Embodiment 2 of the present invention.
Figure 5:
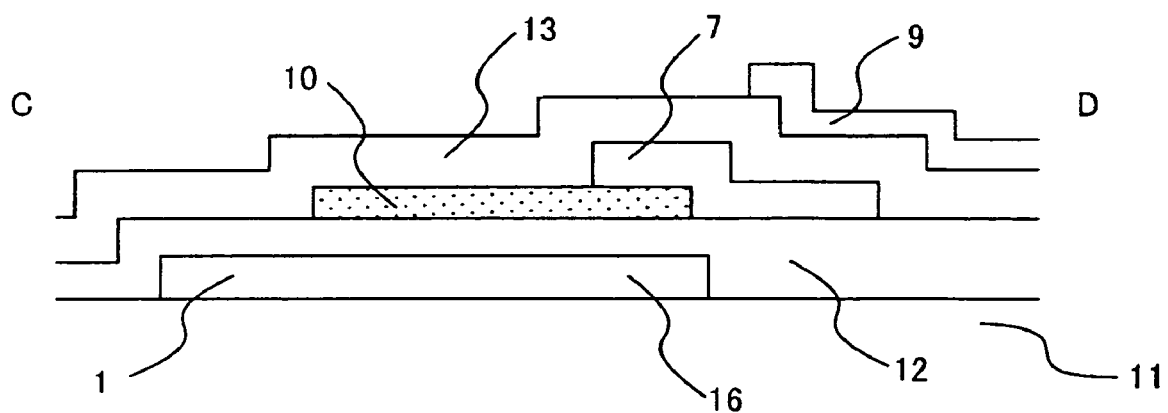
FIG. 5 is a cross-sectional view taken along the plane C-D in FIG. 4.

Embodiment 2 of the present invention will be explained, referring to FIGS. 4 and 5. FIG. 4 is a plan view illustrating approximately one pixel of an active-matrix liquid crystal display device according to Embodiment 2 of the present invention; FIG. 5 is a cross-sectional view taken along the plane C-D in FIG. 4. In FIGS. 4 and 5, the same functional components as those in FIGS. 1 through 3 are indicated by the same numerals as those in FIGS. 1 through 3; the difference between Embodiment 1 and Embodiment 2 will be explained.

In Embodiment 2, a light-cutoff conductor 16 for cutting off light from the back light or the like of a display device is provided, through the insulating film 11, below the restoration strip conductor 10 formed of a semiconductor film. Other constituent elements are the same as those in Embodiment 1. The configuration according to Embodiment 2 can prevent decrease, in semiconductor-film resistance, that is caused by light irradiation onto the restoration strip conductor formed of a semiconductor film. Accordingly, a luminescent-point defect is more securely turned to a dark point to enable restoration of the defect, even in the case of a display device utilizing a liquid crystal having gradation properties, as represented in FIG. 7, in which, when the voltage to be applied to the liquid crystal is the same as or higher than a predetermined value, the gradation is high. Moreover, in Embodiment 2, a case has been exemplified in which the light-cutoff conductor 16 is integrally formed of the same conductive film as that for the scanning line; however, the light-cutoff conductor 16 may be solely formed, or may even be formed of the conductive film situated in a different layer.

Figure 6:
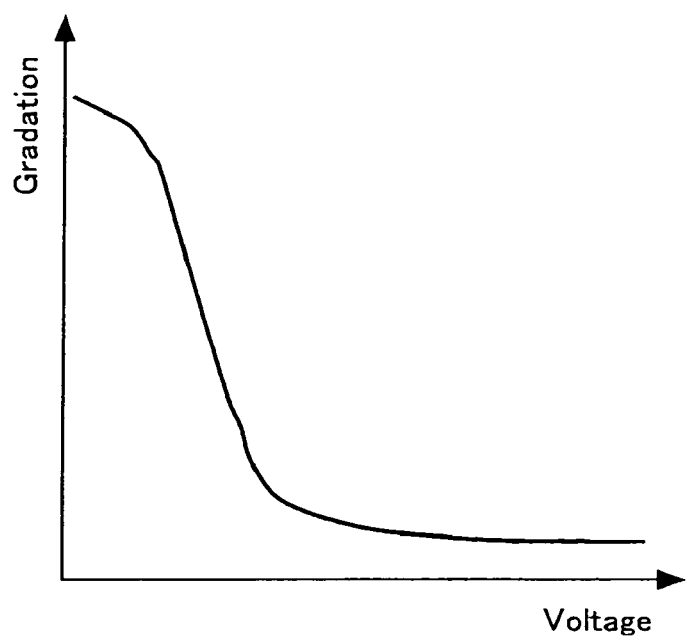
FIG. 6 is a diagram representing gradation properties of a liquid crystal.

In Embodiments 1 and 2 described above, the case has been exemplified in which the present invention is applied to a display device utilizing a liquid crystal having gradation properties, as represented in FIG. 7, in which, when the voltage to be applied to the liquid crystal is the same as or higher than a predetermined value, the gradation is high; however, it goes without saying that, also in the case where the present invention is applied to a display apparatus utilizing a liquid crystal having gradation properties, as represented in FIG. 6, in which the larger the voltage to be applied to the liquid crystal is, the lower the gradation is, the same effect is demonstrated. In addition, in Embodiments 1 and 2 described above, the case has been exemplified in which the restoration strip conductor is connected to the extended portion of the drain electrode; however, the restoration strip conductor may be directly connected to the drain electrode.

In Embodiments 1 and 2 described above, active-matrix display devices utilizing a liquid crystal have been explained; however, the present invention is not limited to Embodiments 1 and 2, but is applicable to all display devices utilizing semiconductor films, even to a display device utilizing a electroluminescence (EL) device.

What is claimed is:

1. A display device comprising:
    a scanning line formed including a gate electrode, on an insulating substrate;
    a video signal line formed intersecting, through an insulating film, with the scanning line;
    a first semiconductor film formed, with an insulating film intervening, on the gate electrode;
    a second semiconductor film formed, with the insulating film intervening, on a portion, of the scanning line, that is apart from the gate electrode;
    a source electrode that is formed on the first semiconductor film and connected to the video signal line;
    a drain electrode formed, opposing the source electrode, on the first semiconductor film;
    a pixel electrode connected to the drain electrode; and
    an extended portion that is connected to the drain electrode and formed so as to cover an edge portion, of the pixel electrode, that is in the vicinity of the scanning line,
wherein the second semiconductor film is connected to the extended portion.

2. The display device according to claim 1, wherein a light-cutoff conductor is formed below the second semiconductor film connected to the extended portion.

3. The display device according to claim 2, wherein the light-cutoff conductor is formed of a conductive film situated in the same layer as that in which the scanning line is situated.

4. A defect restoration method for a display device including a scanning line formed including a gate electrode, on an insulating substrate, a video signal line formed intersecting, with an insulating film intervening, with the scanning line, a first semiconductor film formed, with an insulating film intervening, on the gate electrode, a second semiconductor film formed, with the insulating film intervening, on a portion, of the scanning line, that is apart from the gate electrode, a source electrode that is formed on the first semiconductor film and connected to the video signal line, a drain electrode formed, opposing the source electrode, on the first semiconductor film, a pixel electrode connected to the drain electrode, and an extended portion that is connected to the drain electrode and formed to cover an edge portion, of the pixel electrode, that is in the vicinity of the scanning line, the second semiconductor film being connected to the extended portion, the defect restoration method comprising:
    a step of irradiating a laser beam onto a place where the second semiconductor film and the scanning line overlap, thereby connecting the scanning line with the second semiconductor film.

5. The defect restoration method for a display device, according to claim 4, wherein a light-cutoff conductor is formed below the semiconductor film connected to the extended portion.

6. The defect restoration method for a display device, according to claim 5, wherein the light-cutoff conductor is formed of a conductive film situated in the same layer as that in which the scanning line is situated.

* * * * *